United States Patent
Okana et al.

(10) Patent No.: US 6,322,135 B1
(45) Date of Patent: Nov. 27, 2001

(54) BODY STRUCTURE OF MOTOR VEHICLE

(75) Inventors: Fumio Okana; Hayatsugu Harasaki, both of Hiroshima-Ken (JP)

(73) Assignee: Mazda Motor Corporation, Hiroshima-ken (JP)

(*) Notice: Subject to any disclaimer, the term of this patent is extended or adjusted under 35 U.S.C. 154(b) by 0 days.

(21) Appl. No.: 09/493,177

(22) Filed: Jan. 28, 2000

(30) Foreign Application Priority Data

Jan. 29, 1999 (JP) .................................................. 11-023105

(51) Int. Cl.[7] .................................................. B62D 25/02
(52) U.S. Cl. ...................... 296/203.03; 296/188; 296/209
(58) Field of Search .............................. 296/188, 203.03, 296/209

(56) References Cited

U.S. PATENT DOCUMENTS

| 4,355,843 | 10/1982 | Murakami . | |
|---|---|---|---|
| 4,944,553 | 7/1990 | Medley et al. . | |
| 5,242,209 | * 9/1993 | Yamauchi | 296/188 |
| 5,269,585 | 12/1993 | Klages et al. . | |
| 5,352,011 | * 10/1994 | Kilhara et al. | 296/203 |
| 5,388,885 | * 2/1995 | Warren | 296/203 |
| 5,671,968 | * 9/1997 | Masuda et al. | 296/188 |
| 5,938,275 | * 8/1999 | Kleinhans et al. | 296/203.03 |
| 5,941,597 | * 7/2000 | Horiuchi et al. | 296/203.01 |
| 6,086,141 | * 7/2000 | Masuda et al. | 296/188 |

FOREIGN PATENT DOCUMENTS

| 195 31 874 C1 | 8/1995 | (DE) . |
|---|---|---|
| 195 18 946 A1 | 11/1995 | (DE) . |
| 197 08 905 A1 | 4/1998 | (DE) . |
| 0 856 455 A2 | 8/1998 | (EP) . |
| 10-218017 | 8/1998 | (EP) . |
| 198 05 804 A1 | 8/1998 | (DE) . |
| 8-192238 | 7/1996 | (JP) . |
| 8-337182 | 12/1996 | (JP) . |
| 9-30345 | 2/1997 | (JP) . |
| 9-150752 | 6/1997 | (JP) . |
| 10-95364 | 4/1998 | (JP) . |
| 10-95365 | 4/1998 | (JP) . |
| 10-138950 | 5/1998 | (JP) . |

* cited by examiner

*Primary Examiner*—Joseph D. Pape
(74) *Attorney, Agent, or Firm*—Nixon Peabody LLP; Donald R. Studebaker

(57) ABSTRACT

A body structure of a motor vehicle having an inner section and an outer section is disclosed. The vehicle body structure comprises an outer panel structure and an inner closed section structure. The outer panel structure forms the outer section of the body structure. The inner closed section structure is disposed along an inner side configuration of the outer panel structure and attached to the outer panel structure. The inner closed section structure has a sectional configuration that changes in accordance with changes in the inner side configuration of the outer panel structure and has a closed section that is made of a single member. The outer panel structure has a part that functions as the inner section of the body structure.

15 Claims, 11 Drawing Sheets

BODY STRUCTURE OF MOTOR VEHICLE

BACKGROUND OF THE INVENTION

1. Field of the Invention

The present invention relates to a body structure of a motor vehicle, and in particular to a body structure of a motor vehicle which is provided with a structure manufactured by a tube hydraulic forming method or the like.

2. Description of the Related Art

It is conventionally known that a hollow structure is obtained by supplying high-pressure fluid such as oil into a raw tube and deforming the tube into a predetermined configuration by using a tube hydraulic forming method.

Japanese Patent Unexamined Publication No. 8-337182 discloses a body structure of a motor vehicle which is provided with two hollow structures formed by a tube hydraulic forming method. In the vehicle body structure, the two hollow structures are mutually connected along a partial area of its longitudinal direction.

Japanese Patent Unexamined Publication No. 9-150752 discloses a vehicle body frame structure that comprises a plurality of hoop-shaped members. The hoop-shaped members are obtained by extruding raw aluminum alloy into hollow members and bending the hollow members. Then, the body frame structure is formed by welding the members to make a doorframe and the like.

U.S. Pat. No. 5,269,585 discloses a motor vehicle body, which is provided with extruded hollow profiles or structures.

Similar examples of such conventional art are also disclosed in Japanese Patent Unexamined Publications No. 10-95364, No. 10-95365, No. 9-30345, No. 10-138950 and No. 8-192238.

Since a hollow structure is formed by uniformly pressurizing a raw tube from its inner side by using a tube hydraulic forming method, the, hollow structure can be made from materials such as ultra-high-strength steel. The ultra-high-strength steel has greater tensile strength than material of the conventional structure formed by press molding. As a result, since the hollow structure has greater proof stress and therefore has great strength, the weight of the vehicle body can be decreased. Accordingly, as mentioned above, many vehicle body structures provided with hollow structures formed by the tube hydraulic forming method have been proposed.

However, such hollow structures formed by the tube hydraulic forming method are not enough applied to the vehicle body structure, and various applications of the hollow structures to the vehicle body structure therefore have been demanded.

Further, the application of a hollow structure or a closed section structure made by other than the tube hydraulic forming method to a vehicle body structure also has been demanded.

SUMMARY OF THE INVENTION

It is therefore an object of the present invention to provide a body structure of a motor vehicle which is both light in weight and increased in rigidity or stiffness.

The above object is achieved according to the present invention by providing a body structure of a motor vehicle having an inner section and an outer section comprising an outer panel structure forming the outer section of the body structure, and an inner closed section structure disposed along an inner side configuration of the outer panel structure and attached to the outer panel structure, the inner closed section structure having a sectional configuration which changes in accordance with changes in the inner side configuration of the outer panel structure and having a closed section which is made of a single member, the outer panel structure having a part which functions as the inner section of the body structure.

In a preferred embodiment of the present invention, the outer panel structure is an integral panel forming at least a roof rail outer and a center pillar outer, and the inner closed section structure is integrally disposed along areas of the roof rail outer and the center pillar outer of the outer panel structure.

In another preferred embodiment of the present invention, the outer panel structure is an integral panel forming at least a center pillar outer and a side sill outer, and the inner closed section structure is integrally disposed along areas of the center pillar outer and the side sill-outer of the outer panel structure.

In still another preferred embodiment of the present invention, the outer panel structure is an integral panel forming at least a center pillar outer and a roof outer, and the inner closed section structure is integrally disposed along areas of the center pillar outer and the roof outer of the outer panel structure.

In another preferred embodiment of the present invention, the outer panel structure is an integral panel forming at least a center pillar outer and a floor outer, and the inner closed section structure is integrally disposed along areas of the center pillar outer and the floor outer of the outer panel structure.

In another preferred embodiment of the present invention, the inner closed section structure has a closed section integrally disposed along areas of a center pillar section, a roof section and a floor section of the outer panel structure.

In another preferred embodiment of the present invention, the inner closed section structure has a closed section integrally disposed along areas of a center pillar section, a roof section, a floor section and a roof rail section of the outer panel structure.

In still another preferred embodiment of the present invention, the inner closed section structure has a closed section integrally disposed along areas of a center pillar section, a roof section, a floor section and a side sill of the outer panel structure.

In another preferred embodiment of the present invention, the outer panel structure is manufactured by press molding, and the inner closed section structure is manufactured by a tube hydraulic forming method.

In still further another preferred embodiment of the present invention, the integral panel of the outer panel structure has a flange to which seal means is attached.

The above and other objects and features of the present invention will be apparent from the following description by taking reference with accompanying drawings employed for preferred embodiments of the present invention.

DETAILED DESCRIPTION OF THE PREFERRED EMBODIMENTS

Hereinafter, the preferred embodiments of the present invention will be explained with reference to the drawings.

A first embodiment of the present invention will be explained with reference to FIGS. 1 through 8.

Figure 1:
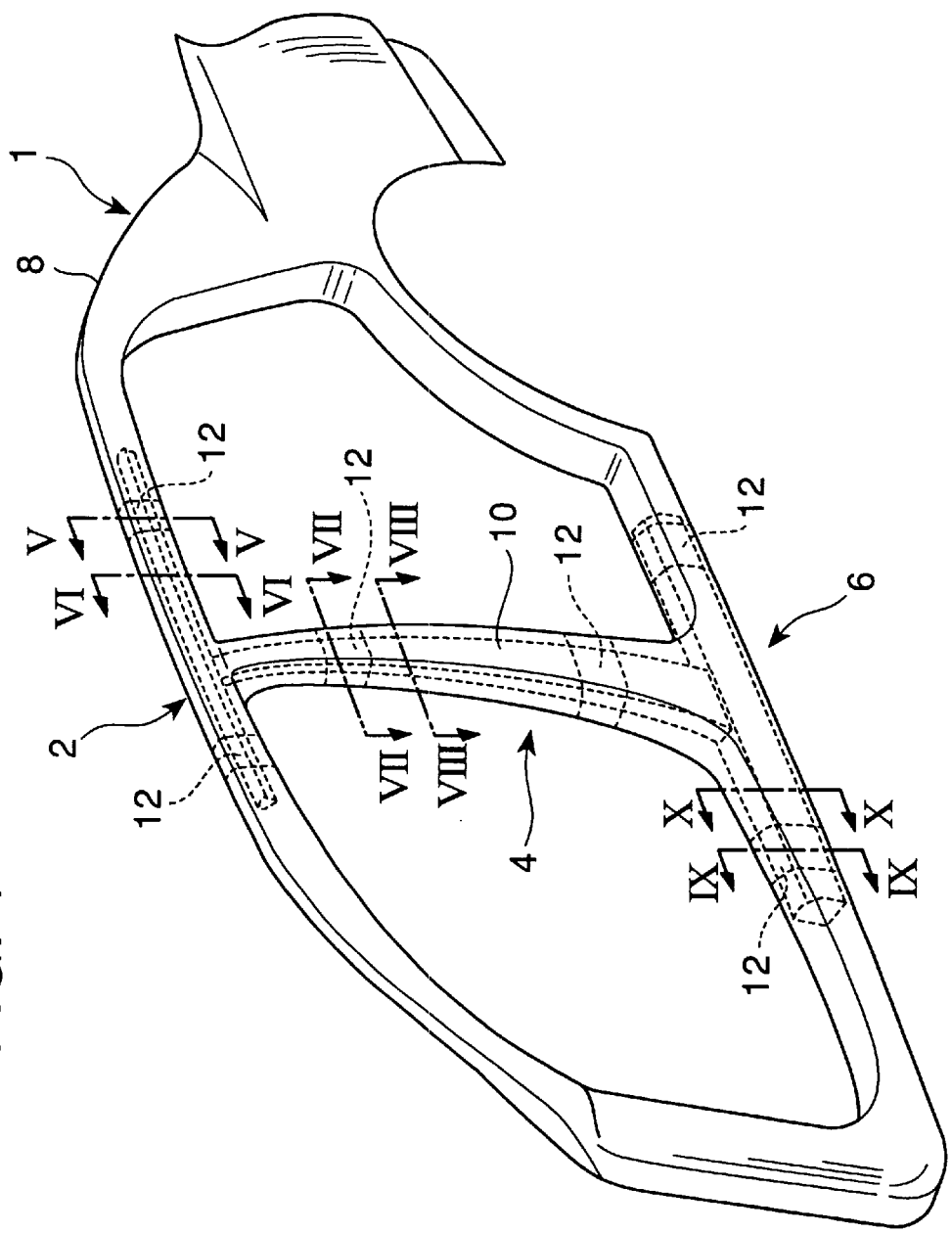
FIG. 1 is an overall perspective view of a body structure of a motor vehicle according to a first embodiment of the present invention.
Figure 2:
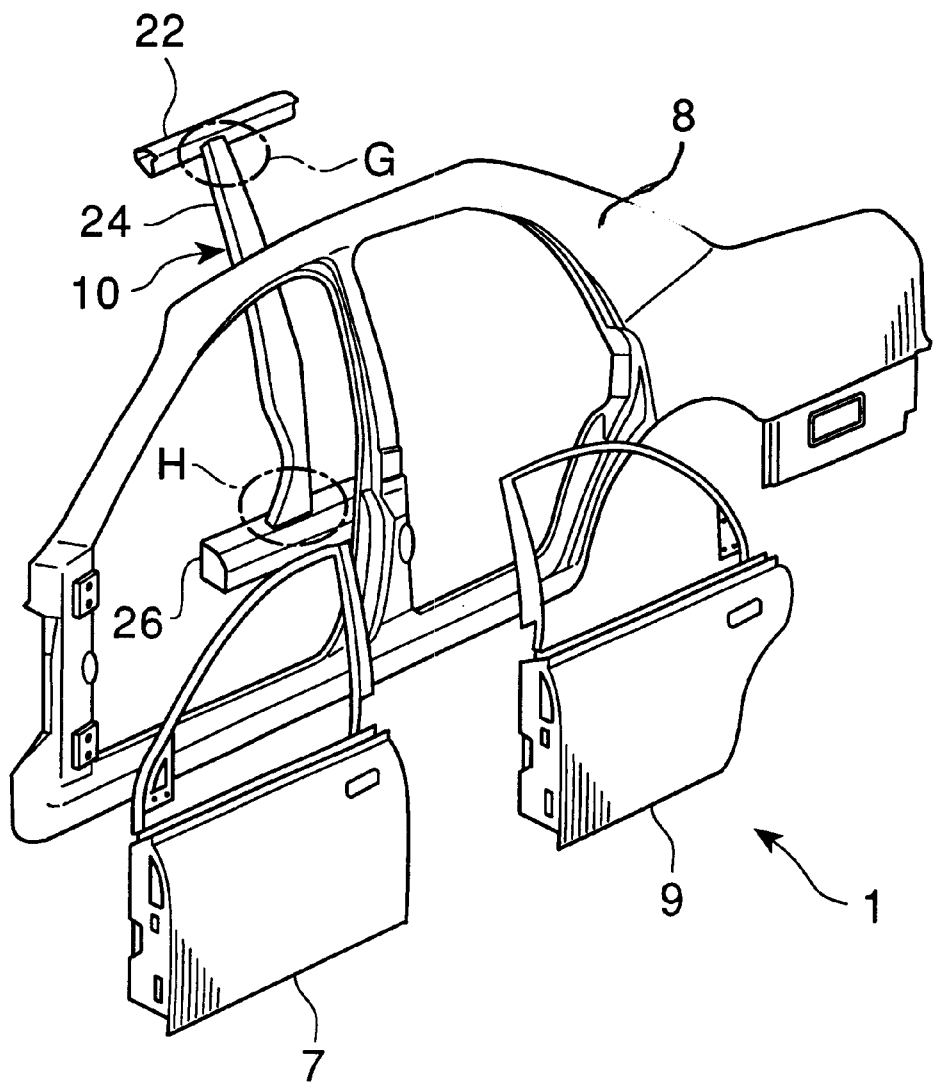
FIG. 2 is an exploded perspective view of components of the first embodiment of FIG. 1.

Referring to FIGS. 1 and 2, a reference numeral 1 designates a side body structure of a motor vehicle which is provided with a roof rail section 2, a center pillar section 4 and a side sill section 6. The vehicle side body structure 1 comprises a side frame outer panel 8, which is an outer panel structure forming an outer section of the vehicle side body structure, and an inner closed section structure 10. The inner closed section structure 10 is disposed along the side frame outer panel 8 in a passenger compartment side and forms a part of an inner section of the vehicle side body structure 1. The vehicle side body structure 1 further comprises a plurality of inner bands 12 which are used to attach the inner closed section structure 10 to the side frame outer panel 8.

The side frame outer panel 8 forming the outer panel structure is manufactured by press molding.

Front doors 7 and rear doors 9 are respectively attached to the side frame out panel 8 of the vehicle side body structure 1.

Referring to FIG. 2, the inner closed section structure 10 is composed of a roof rail reinforcement 22, a center pillar reinforcement 24 and a side sill reinforcement 26. The sectional configurations of the inner closed section structure 10 change in accordance with changes in the inner side configurations of the roof rail section 2, the center pillar section 4 and the side sill section 6 of the side frame outer panel 8.

Figure 3:
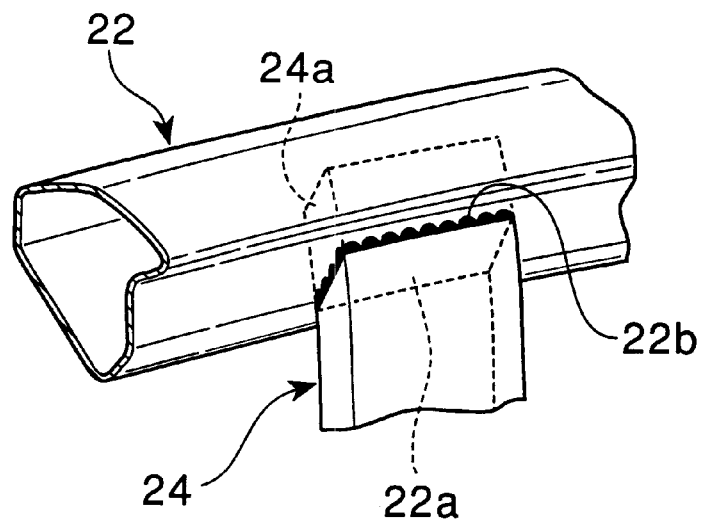
FIG. 3 is an enlarged perspective view of a portion designated as G in FIG. 2.

Referring to FIG. 3, an upper end 24a of the center pillar reinforcement 24 is inserted into an opening 22a of the roof rail reinforcement 22 and is connected with a connection portion 22b of the roof rail reinforcement 22 by welding or the like. Thus, the upper end 24a of the center pillar reinforcement 24 is connected with the roof rail reinforcement 22.

Figure 4:
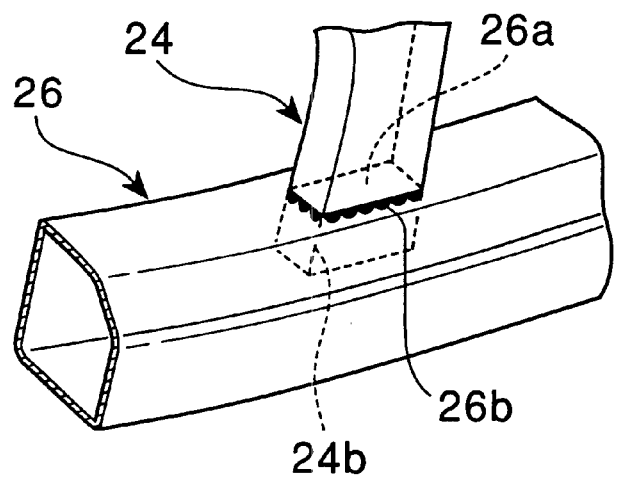
FIG. 4 is an enlarged perspective view of a portion designated as E in FIG. 2.

Referring to FIG. 4, a lower end 24b of the center pillar reinforcement 24 is inserted into an opening 26a of the side sill reinforcement 26 and is connected with a connection portion 26b of the side sill reinforcement 26 by welding or the like. Thus, the lower end 24b of the center pillar reinforcement 24 is connected with the side sill reinforcement 26.

The inner closed section structure 10 is formed in the following manner. First, the roof rail reinforcement 22, the center pillar reinforcement 24 and the side sill reinforcement 26 are respectively manufactured by supplying high-pressure fluid such as oil into raw tubes and then deforming the tubes into predetermined configurations under predetermined conditions of the tube hydraulic forming method. Thereafter, as mentioned above, the upper end 24a of the center pillar reinforcement 24 is connected with the roof rail reinforcement 22, and the lower end 24b of the center pillar reinforcement 24 is connected with the side sill reinforcement 26. As a result, the integrally formed inner closed section structure 10 is obtained.

Next, respective sectional configurations of the vehicle side body structure 1 will be explained with references to FIGS. 5 through 10.

Figure 5:
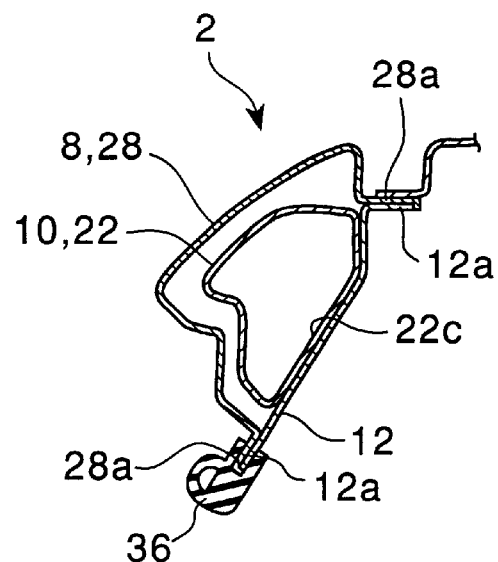
FIG. 5 is a sectional view of the first embodiment taken along line V—V in FIG. 1.

Referring to FIG. 5, in an area of the roof rail reinforcement 2 of the side body structure 1 in which the inner band 12 is provided, a roof rail outer 28, which is a part of the side frame outer panel 28, is disposed at an outer side. The roof rail reinforcement 22 of the inner closed section structure 10 is disposed at the passenger compartment side of the roof rail outer 28, and the inner band 12 is disposed at the passenger compartment side of the roof rail reinforcement 22. A flange 28a of the roof rail outer 28 and a flange 12a of the inner band 12 are mutually connected. A part 22c of the surface of the roof rail reinforcement 22 located at an inner side thereof is connected with the inner band 12 by spot welding. A seal member 36 is attached to the flanges 12a and 28a to contact the door 9 so that an opening for the door 9 is sealed.

Figure 6:
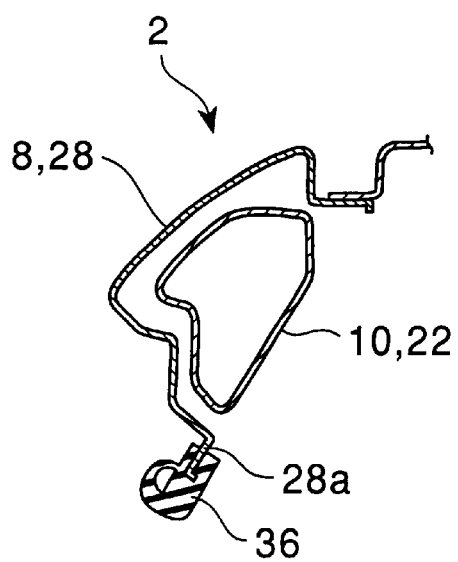
FIG. 6 is a sectional view of the first embodiment taken along line VI—VI in FIG. 1.

Referring to FIG. 6, in an area of the roof rail reinforcement 2 of the side body structure 1 in which the inner band 12 is not provided, the roof rail outer 28, which is a part of the side frame outer panel 8, is disposed at an outer side. The roof rail reinforcement 22 of the inner closed section structure 10 is disposed at the passenger compartment side of the roof rail outer 28. The roof rail outer 28 is provided with the flange 28a to which the seal member 36 is attached. The seal member 36 contacts the door 9 so that the opening for the door 9 is sealed.

According to the first embodiment of the present invention, the vehicle side body structure 1 does not need to be provided with an inner section or a roof rail inner of the side body structure, which components need to be provided for the conventional side body structure, since the inner closed section structure 10 of the first embodiment functions, in the area in which the inner band 12 is not provided, as a part of the inner section or the roof rail inner.

Figure 7:
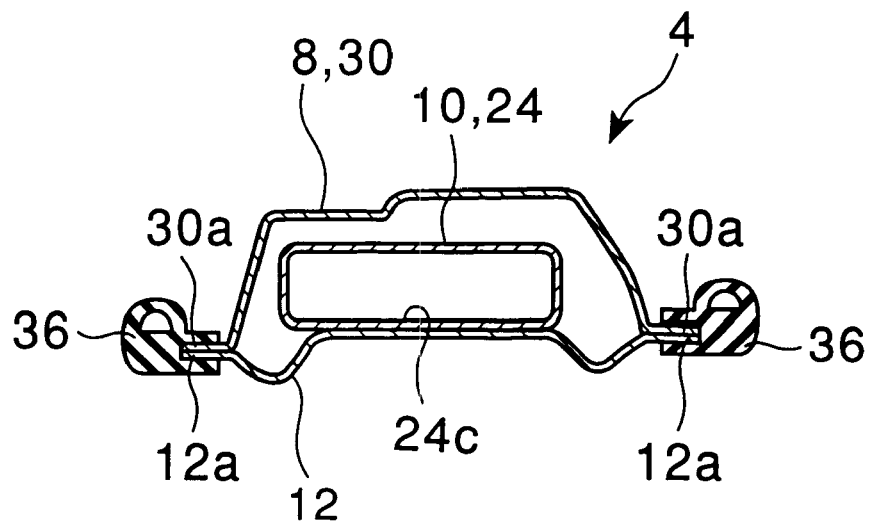
FIG. 7 is a sectional view of the first embodiment taken along line VII—VII in FIG. 1.

Referring to FIG. 7, in an area of the center pillar section 4 of the side body structure 1 in which the inner band 12 is provided, a center pillar outer 30, which is a part of the side frame outer panel 8, is disposed at an outer side. The center pillar reinforcement 24 of the inner closed section structure 10 is disposed at the passenger compartment side of the center pillar outer 30, and the inner band 12 is disposed at the passenger compartment side of the center pillar reinforcement 24. A flange 30a of the center pillar outer 30 and a flange 12a of the inner band 12 are mutually connected. A part 24c of the surface of the center pillar reinforcement 24 located at an inner side thereof is connected with the inner band 12 by spot welding. The seal members 36 are attached to the flanges 12a and 30a to contact the doors 7 and 9 so that the openings for the doors 7 and 9 are sealed.

Figure 8:
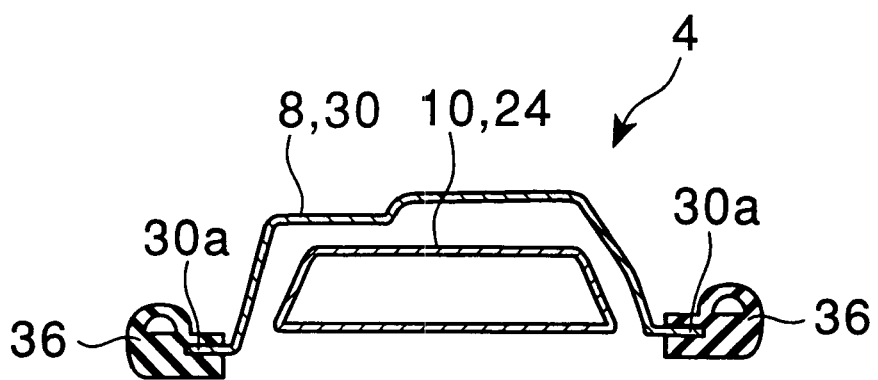
FIG. 8 is a sectional view of the first embodiment taken along line VII—VIII in FIG. 1.

Referring to FIG. 8, in an area of the center pillar section 4 of the side body structure 1 in which the inner band 12 is not provided, the center pillar outer 30, which is a part of the side frame outer panel 8, is disposed at an outer side. The center pillar reinforcement 24 of the inner closed section structure 10 is disposed at the passenger compartment side of the center pillar outer 30. A flange 30a of the center pillar outer 30 and a flange 12a of the inner band 12 are mutually connected. A part 24c of the surface of the center pillar reinforcement 24 located at an inner side thereof is connected with the inner band 12 by spot welding. The seal members 36 are attached to the flanges 12a and 30a to contact the doors 7 and 9 so that the openings of the doors 7 and 9 are sealed. The center pillar outer 30 is provided with the flanges 30a to which the seal members 36 are respectively attached. The seal members 36 contact the doors 7 and 9 so that the opening for the doors 7 and 9 are sealed.

According to the first embodiment of the present invention, the side body structure 1 does not need to be provided with an inner section or a center pillar inner of the side body structure, which components need to be provided for the conventional side body structure. This is because the inner closed section structure 10 functions, in the area in which the inner band 12 is not provided, as a part of the inner section or the center pillar inner.

Figure 9:
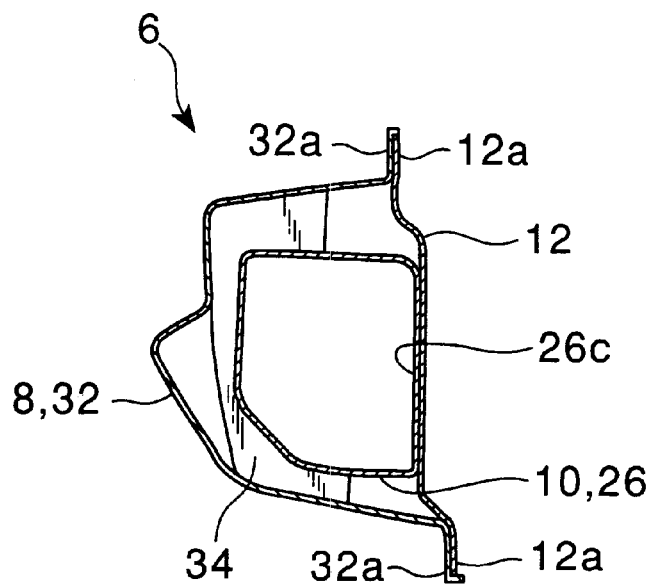
FIG. 9 is a sectional view of the first embodiment taken along line IX—IX in FIG. 1.

Referring to FIG. 9, in an area of the side sill section 6 of the side body structure 1 in which the inner band 12 is provided, a side sill outer 32, which is a part of the side frame outer panel 8, is disposed at an outer side. The side sill reinforcement 26 of the inner closed section structure 10 is disposed at the passenger compartment side of the side sill outer 32, and the inner band 12 is disposed at the passenger compartment side of the side sill reinforcement 26. Flanges 32a of the side sill outer 32 and the flanges 12a of the inner band 12 are mutually connected. A part 26c of the surface of the side sill reinforcement 26 located at an inner side thereof is connected with the inner band 12 by spot welding. In the side sill section 6, a plurality of flat plate node members 34 are disposed along the side sill 6 between the side sill outer 32 and the side sill reinforcement 26 so as to increase the rigidity of the side sill section 6 and to prevent the distortion of the side sill section 6.

Figure 10:
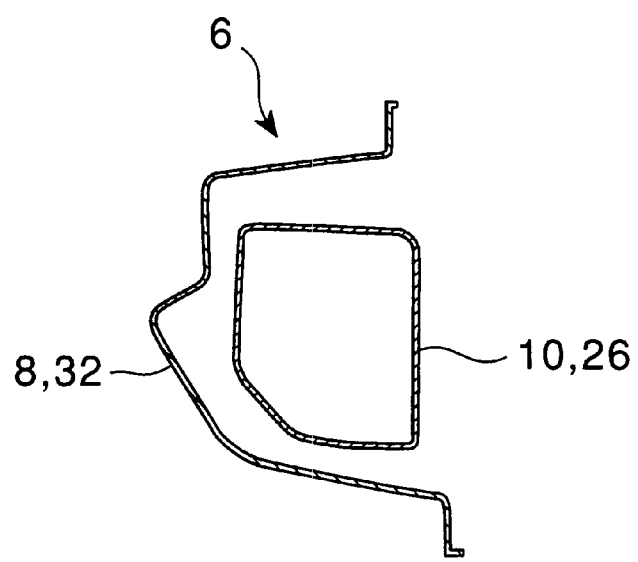
FIG. 10 is a sectional view of the first embodiment taken along line X—X in FIG. 1.

Referring to FIG. 10, in an area of the side sill section 6 of the side body structure 1 in which the inner band 12 is not provided, the side sill outer 32, which is a part of the side frame outer panel 8, is disposed at an outer side. The side sill reinforcement 26 of the inner closed section structure 10 is disposed at the passenger compartment side of the side sill outer 32.

The first embodiment of the present invention has the following advantageous effects.

The vehicle side body structure 1 does not need to be provided with the inner section, namely the roof rail inner, the center pillar inner and/or the side sill inner, which components need to be provided for the conventional side body structure. This is because the inner closed section structure 10 functions, in the area in which the inner band 12 is not provided, as a part of the inner section.

Since the side frame outer panel 8 forming the outer panel structure is combined with the inner closed section structure 10 to obtain the vehicle side body structure 1, the rigidity of the vehicle side body structure 1 is increased.

Since the inner closed section structure 10 is made of a single member, as compared with the conventional side body structure, the amount of material and numbers of components are both decreased and thus the weight of the vehicle side body structure 1 is lightened.

Since the inner closed section structure 10 is manufactured by the tube hydraulic forming method, the rigidity or stiffness of the side body structure 1 is increased and the weight of the side body structure 1 is decreased, in comparison with the conventional side body structure manufactured by the press molding.

Since the sectional configurations of the inner closed section structure 10 change in accordance with changes in the inner side configurations of the roof rail section 2, the center pillar section 4 and the side sill section 6 of the side frame outer panel 8, the number of the components can be decreased.

Since the outer panel structure 8 forming the side frame outer panel 8 is disposed at the outer side of the inner closed section structure 10, the flanges of the side frame outer panel 8 can be effectively utilized as the connection portions with the seal portions and the glasses.

Next, a second embodiment of the present invention will be explained with reference to FIGS. 11 through 17.

Figure 11:
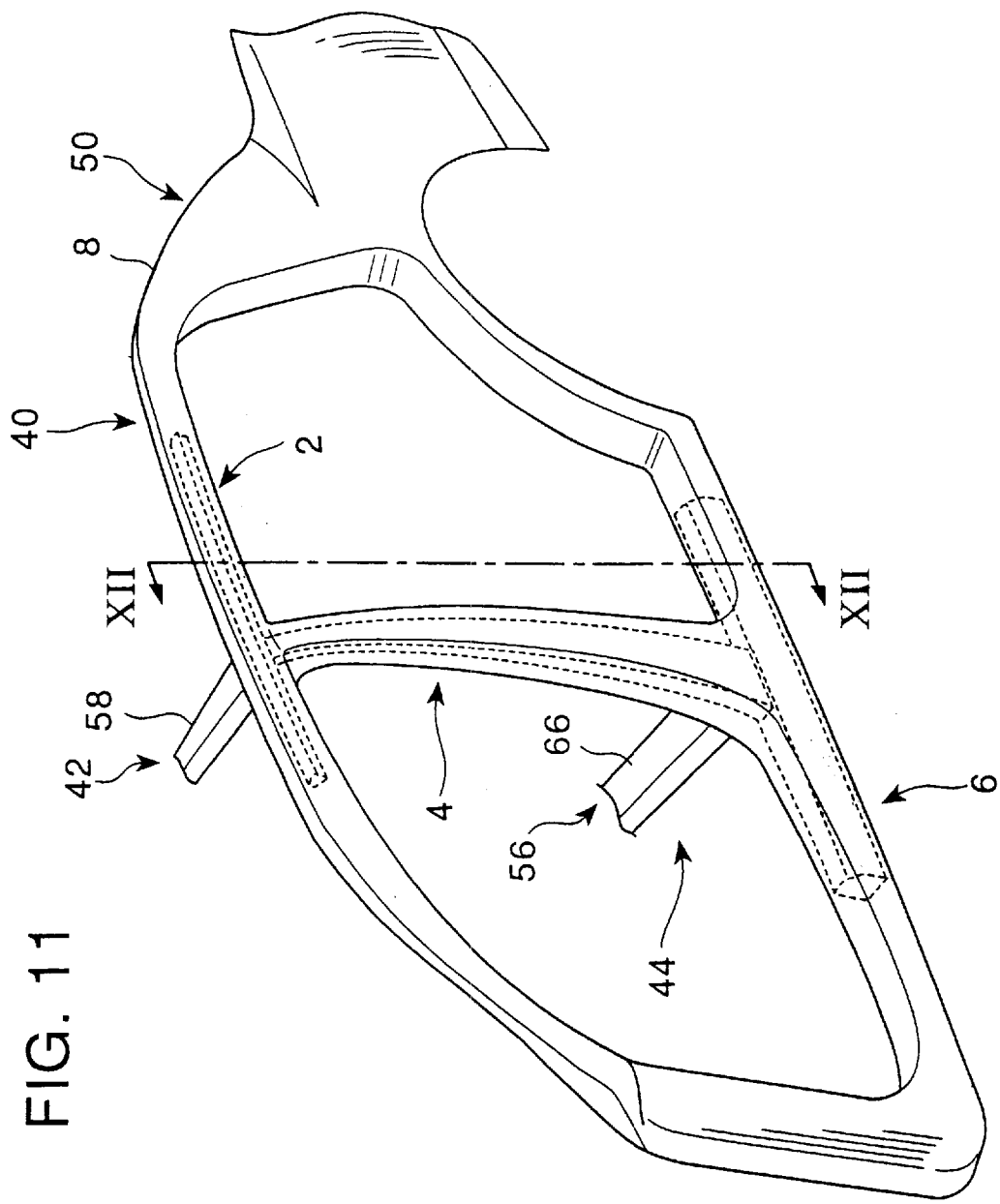
FIG. 11 is a partial perspective view of a body structure of a motor vehicle according to a second embodiment of the present invention.
Figure 12:
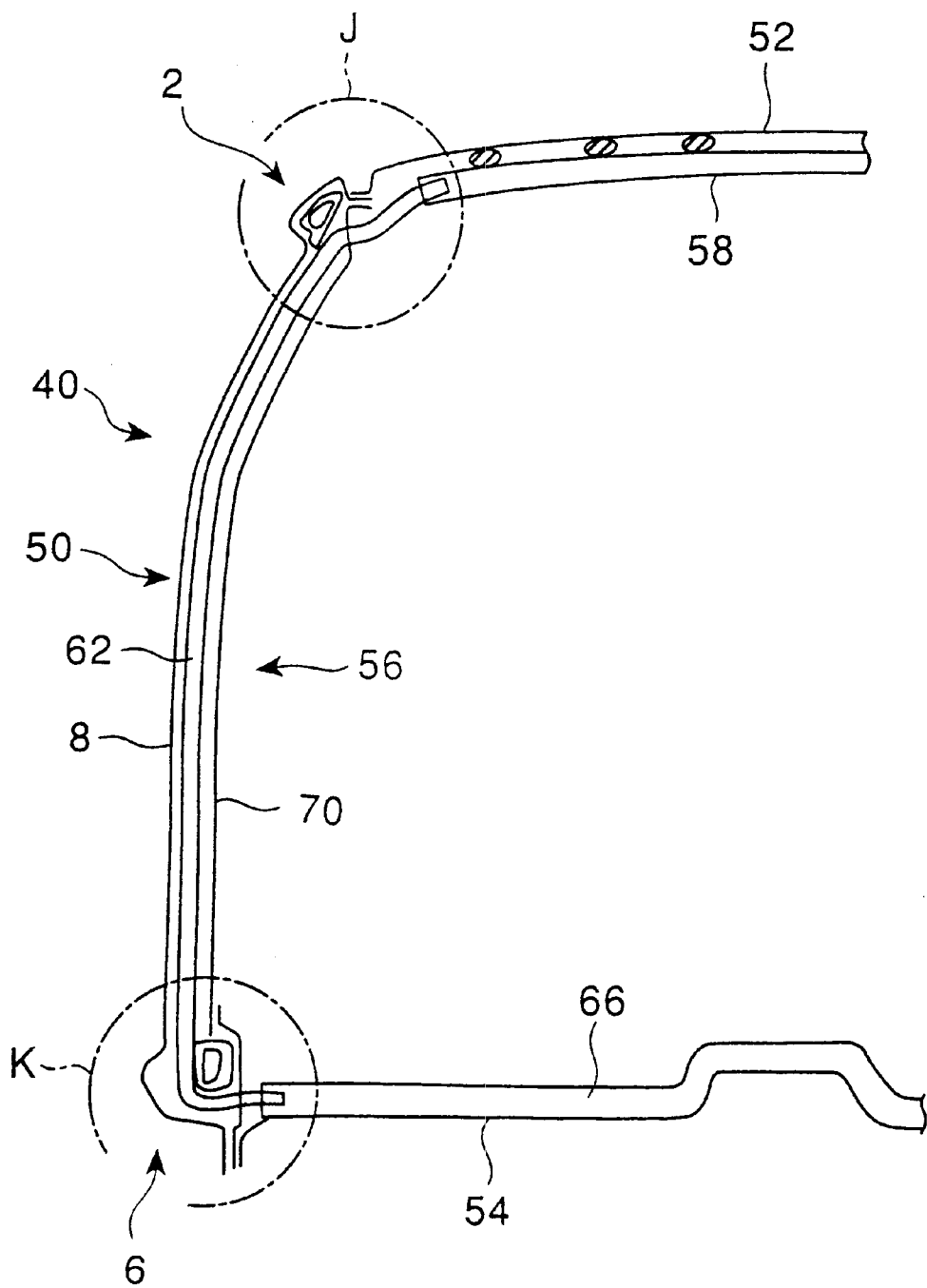
FIG. 12 is a sectional view of the second embodiment taken along line XII—XII in FIG. 11.

Referring to FIGS. 11 and 12, a body structure 40 of a motor vehicle comprises a roof rail section 2, a center pillar section 4 and a side sill section 6. In the second embodiment, the vehicle body structure 1 further comprises a roof section 42 and a floor section 44.

The vehicle body structure 40 is provided with an outer panel structure 50 (only one side thereof is shown in FIG. 11) forming an outer section of the body structure 40. The outer panel structure 50 is composed of a side frame outer panel 8, a roof outer panel 52 and a floor outer panel 54. The side frame outer panel 8 is integrally provided with the roof rail outer 28, the center pillar outer 30 and the side sill outer 32. These panels 8, 52 and 54 are connected to each others flanges to form an annular structure. The vehicle body structure 40 is further provided with an inner closed section structure 56 which is composed of a roof reinforcement 58, a roof rail reinforcement 60, a center pillar reinforcement 62, a side sill reinforcement 64 and a floor cross member 66. These reinforcements 58, 60, 62 and 64 and the member 66 are connected to each other by welding or the like to form an integral structure. The vehicle body structure 40 is further provided with a roof rail inner 68, a center pillar inner 70 and a side sill inner 72 but is not provided with a roof inner panel and a floor inner panel. The roof rail inner 68, the center pillar inner 70 and side sill inner 72 are respectfully connected with the roof rail outer 28, the center pillar outer 30 and the side sill outer 32 so as to form a side body structure having closed sections. The roof rail inner 68, the center pillar inner 70 and side sill inner 72 are respectfully connected with the roof rail outer 28, the center pillar outer 30 and the side sill outer 32 so as to form a side body structure having closed sections.

More specifically, the side frame outer panel 8, the roof outer panel 52 and the floor outer panel 54 of the outer panel structure 50 are respectively manufactured by press molding like conventional outer panels. The outer panels 8, 52 and 54 of the outer panel structure 50 are connected to each other through flanges 8a, 52a and 54a by welding or the like to form an integral structure (see FIGS. 14 and 17).

The roof reinforcement 58, the roof rail reinforcement 60, the center pillar reinforcement 62, the side sill reinforcement 64 and the floor cross member 66 of the inner closed section structure 56 are respectively manufactured by the above-mentioned tube hydraulic forming method. Namely, at first, high-pressure fluid such as oil is supplied into the reinforcements 58, 60, 62 and 64 and the member 66 under predetermined conditions of the tube hydraulic forming method. Thereafter, the reinforcements 58, 60, 62 and 64 and the member 66 are respectively deformed into predetermined configurations and then connected each other. As a result, the integral inner closed section structure 56 is obtained.

The sectional configurations of the inner closed section structure 56 change in accordance with changes in the inner side configurations of the roof rail section 2, the center pillar section 4 and the side sill section 6 of the outer panel structure 50.

Figure 14:
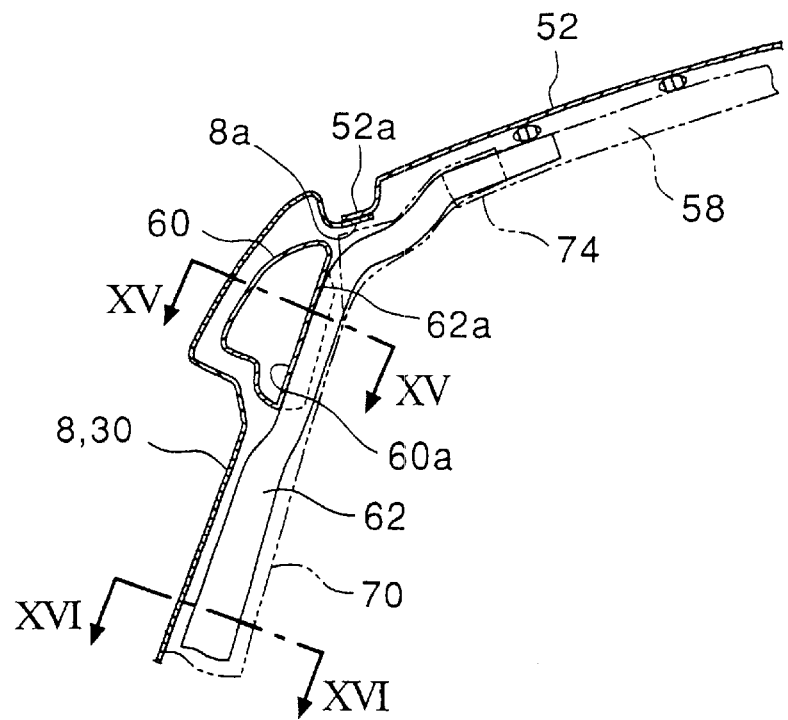
FIG. 14 is an enlarged sectional view of a portion designated as J in FIG. 12.

Referring to FIGS. 12 and 14, both ends of the roof reinforcement 58 are respectively connected at connecting portions 74 with upper ends of the center pillar reinforcements 62.

Figure 17:
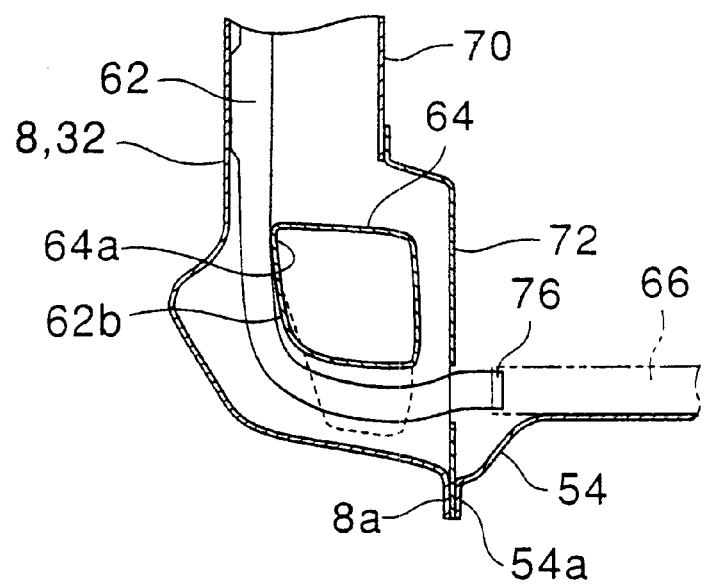
FIG. 17 is an enlarged sectional view of a portion designated as K in FIG. 12.

Referring to FIGS. 12 and 17, both ends of the cross member 66 are respectively connected at connecting portions 76 with lower ends of the center pillar reinforcements 62.

Figure 13:
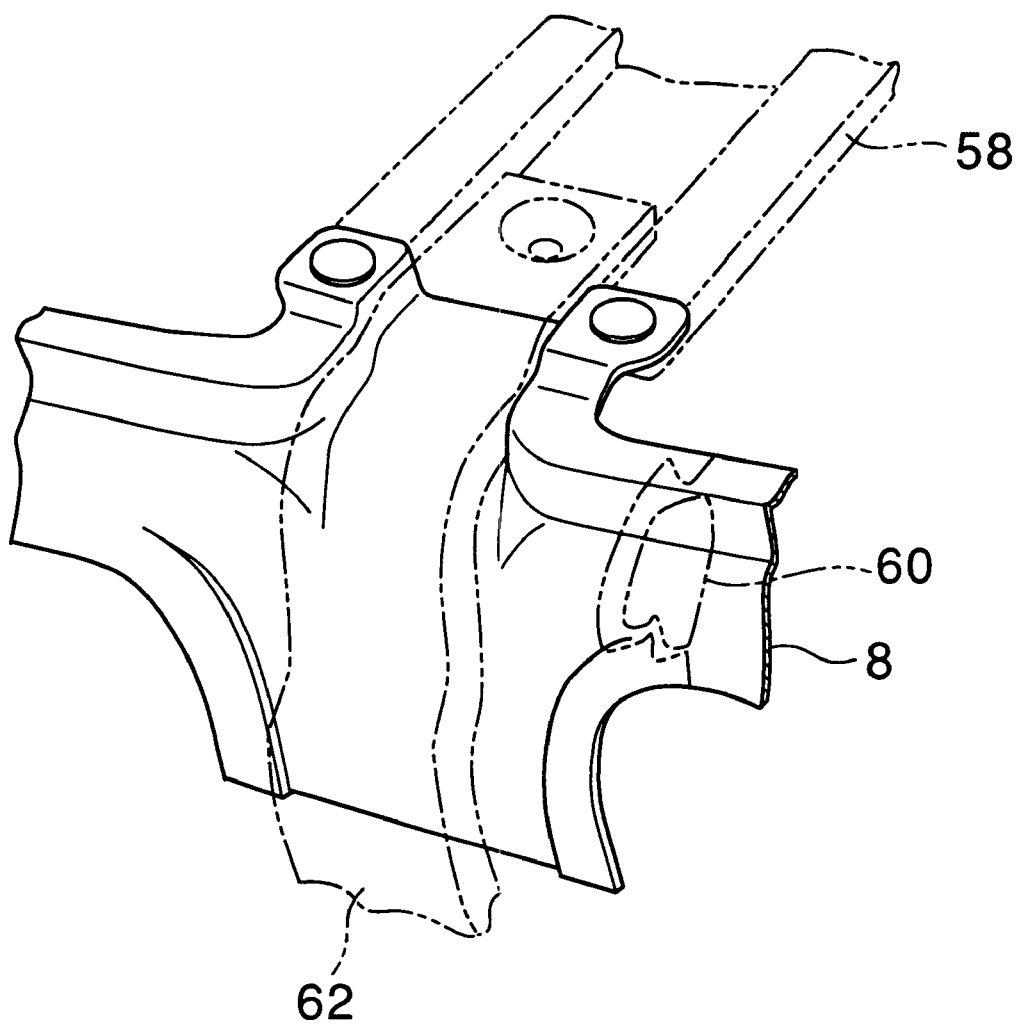
FIG. 13 is an enlarged perspective view of a portion designated as J in FIG. 12.
Figure 15:
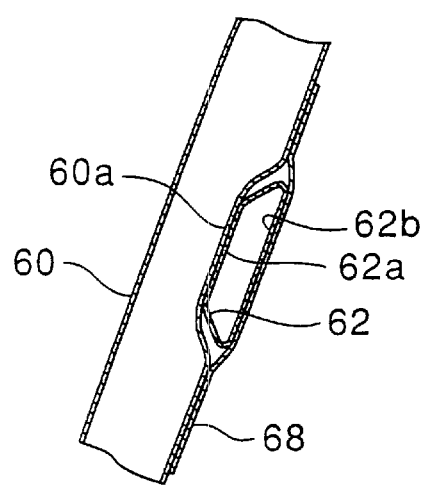
FIG. 15 is a sectional view of the second embodiment taken along line XV—XV in FIG. 14.

Referring to FIGS. 13 and 15, the center pillar reinforcement 62 is disposed at an inner side of the roof rail reinforcement 60 so as to intersect vertically the roof rail reinforcement 60. A part 60a of the inner side surface of the roof rail reinforcement 60 is connected by spot welding with a part 62a of the outer side surface of the intersected portion of the center pillar reinforcement 62. Further, a part 62b of the inner side surface of the center pillar reinforcement 62 is connected by spot welding with the roof rail inner 68.

Referring to FIGS. 13 and 17, the side sill reinforcement 64 is disposed at an inner side of the lower end of the center pillar reinforcement 62 so as to intersect vertically the center pillar reinforcement 62. A part 62b of the inner side surface of the center pillar reinforcement 62 is connected by spot welding with a part 64a of the outer side surface of the intersected portion of the side sill reinforcement 64.

Figure 16:
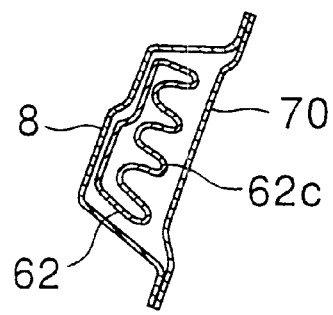
FIG. 16 is a sectional view of the second embodiment taken along line XVI—XVI in FIG. 14.

Referring to FIG. 16, the center portion of the center pillar reinforcement 62 has a sectional configuration including a wavy form 62c.

As mentioned above, in the second embodiment, the vehicle body structure 40 is provided with the roof rail inner 68, the center pillar inner 70 and the side sill inner 72 but is not provided with the roof rail inner panel and the floor inner panel. However, the second embodiment is not limited to the above-mentioned structure. Namely, in the second embodiment, the vehicle body structure 40 may not be provided with any one of the above components, namely, the roof rail inner 68, the center pillar inner 70, the side sill inner 72, the roof rail inner panel and the floor inner panel. Further, in the second embodiment, the vehicle body structure 40 may not be provided with redetermined components taken from the components 68, 70, 72, the roof rail inner panel and the floor inner panel.

The second embodiment of the present invention has the following advantageous effects.

The inner closed section structure 56 function as the inner section of the vehicle body structure 40. More specifically, the roof reinforcement 58 and the floor cross member 66 of the inner closed section structure 56 respectively function as the roof inner panel in the roof section 42 and the floor inner panel in the floor section 44 of the vehicle body structure 40. As a result, for example, the roof inner panel and the floor inner panel that are required in the conventional body structure are not required in the vehicle body structure 40 of the second embodiment.

Since the outer panel structure 50 is combined with the inner closed section structure 56 to obtain the vehicle body structure 40, the rigidity of the vehicle body structure 40 is increased. Since the inner closed section structure 56 is an annular structure, the rigidity of the body structure 50 against a load acting from the side direction of the vehicle is greatly increased.

Since the inner closed section structure 56 is manufactured by the tube hydraulic forming method, the rigidity of the body structure 40 is increased and the weight of the body structure 40 is decreased in comparison with the conventional body structure manufactured by the press molding.

Since the sectional configurations of the inner closed section structure 56 change in accordance with changes in the inner side configurations of the roof rail section 2, the center pillar section 4 and the side sill section 6 of the outer panel structure 50, the number of the components can be decreased.

Since the outer panel structure 50 such as the side frame outer panel 8 or the like is disposed at the outer side of the inner closed section structure 56, the flanges of the side frame outer panel 8 or the like forming the outer panel structure 50 can be effectively utilized as the connection portions with the seal portions and the glasses.

Although the present invention has been explained with reference to specific, preferred embodiments, one of ordinary skill in the art will recognize that modifications and improvements can be made while remaining within the scope and spirit of the present invention. The scope of the present invention is determined solely by appended claims.

What is claimed is:

1. A body structure of a motor vehicle having an inner section and an outer section comprising:
    an outer panel structure forming the outer section of the body structure; and
    an inner closed section structure disposed along an inner side configuration of the outer panel structure and attached to the outer panel structure, said inner closed section structure having a sectional configuration which changes in accordance with changes in the inner side configuration of the outer panel structure and having a closed section which is made of a single member, said inner closed section structure having a part which functions as the inner section of the body.

2. A body structure of a motor vehicle according to claim 1, wherein said outer panel structure is an integral panel forming at least a roof rail outer and a center pillar outer, and said inner closed section structure is integrally disposes along areas of the roof rail outer and the center pillar outer of the outer panel structure.

3. A body structure of a motor vehicle according to claim 1, wherein said outer panel structure is an integral panel forming at least a center pillar outer and a side sill outer, and said inner closed section structure is integrally disposed along areas of the center pillar outer and the side sill outer of the outer panel structure.

4. A body structure of a motor vehicle according to claim 1, wherein said outer panel structure is an integral panel forming at least a center pillar outer and a roof outer, and said inner closed section structure is integrally disposed along areas of the center pillar outer and the roof outer of the outer panel structure.

5. A body structure of a motor vehicle according to claim 1, wherein said outer panel structure is an integral panel forming at least a center pillar outer and a floor outer, and said inner closed section structure is integrally disposed along areas of the center pillar outer and the floor outer of the outer panel structure.

6. A body structure of a motor vehicle according to claim 1, wherein said inner closed section structure has a closed section integrally disposed along areas of a center pillar section, a roof section and a floor section of the outer panel structure.

7. A body structure of a motor vehicle according to claim 1, wherein said inner closed section structure has a closed section integrally disposed along areas of a center pillar section, a roof section, a floor section and a roof rail section of the outer panel structure.

8. A body structure of a motor vehicle according to claim 1, wherein said inner closed section structure has a closed section integrally disposed along areas of a center pillar section, a roof section, a floor section and a side sill of the outer panel structure.

9. A body structure of a motor vehicle according to claim 1, wherein said outer panel structure is manufactured by press molding, and said inner closed section structure is manufactured by a tube hydraulic forming method.

10. A body structure of a motor vehicle according to claim 2, wherein said body structure further comprises an inner band disposed at a passenger compartment side of the inner closed section structure, the outer panel structure and the inner band respectively have flanges which are mutually connected, and a seal member is attached to the flanges for sealing an opening of a door by contacting with the door.

11. A body structure of a motor vehicle according to claim 1, wherein said outer panel structure includes side frame outer panels, a roof outer panel and a floor outer panel, and upper ends of the side frame outer panels are respectively connected with both outer side ends along a vehicle width direction of the roof outer panel and lower ends of the side frame outer panels are respectively connected with outer side both ends along the vehicle width direction of the floor outer panel so that the outer panel structure forms an annular structure, and wherein said inner closed section structure includes center pillar reinforcements, a roof reinforcement and a floor cross member, and upper ends of the center pillar reinforcements are respectively connected with both outer side ends along the vehicle width direction of the roof reinforcement and lower ends of the center pillar reinforcements are respectively connected with both outer side ends along the vehicle width direction of the floor cross member so that the inner closed section structure forms a second annular structure.

12. A body structure of a motor vehicle according to claim 11, wherein said inner closed section structure further includes a roof rail reinforcement and a side sill reinforcement, the center pillar reinforcement is disposed at a passenger compartment side of the roof rail reinforcement so as to intersect vertically the roof rail reinforcement and the center pillar reinforcement and the roof rail reinforcement are mutually connected at an intersection thereof, and the side sill reinforcement is disposed at the passenger compartment side of the center pillar reinforcement so as to intersect vertically the center pillar reinforcement and the side sill reinforcement and the center pillar reinforcement are mutually connected at an intersection thereof.

13. A body structure of a motor vehicle according to claim 11, wherein said inner closed section structure further includes a roof rail reinforcement, the center pillar reinforcement is disposed at a passenger compartment side of the roof rail reinforcement so as to intersect vertically the roof rail reinforcement and the center pillar reinforcement and the roof rail reinforcement are mutually connected at an intersection thereof.

14. A body structure of a motor vehicle according to claim 11, wherein said inner closed section structure further includes a side sill reinforcement, and the side sill reinforcement is disposed at the passenger compartment side of the center pillar reinforcement so as to intersect vertically the center pillar reinforcement and the side sill reinforcement and the center pillar reinforcement are mutually connected at an intersection thereof.

15. A body structure of a motor vehicle according to claim 12, wherein said body structure further comprises inner members, the inner members being disposed at passenger compartment sides of at least the roof rail reinforcement, the center pillar reinforcement and the side sill reinforcement of the inner closed section structure.

* * * * *